United States Patent
Costa Tomas

(10) Patent No.: US 12,321,778 B1
(45) Date of Patent: Jun. 3, 2025

(54) PREEMPTIVE SCHEDULING FOR SERVERLESS HIGH PERFORMANCE COMPUTING

(71) Applicant: Amazon Technologies, Inc., Seattle, WA (US)

(72) Inventor: Tiago Costa Tomas, Zaandam (NL)

(73) Assignee: Amazon Technologies, Inc., Seattle, WA (US)

( * ) Notice: Subject to any disclaimer, the term of this patent is extended or adjusted under 35 U.S.C. 154(b) by 553 days.

(21) Appl. No.: 17/474,963

(22) Filed: Sep. 14, 2021

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/4825* (2013.01); *G06F 9/505* (2013.01)

(58) Field of Classification Search
CPC ....... G06F 9/4881; G06F 9/4825; G06F 9/505
See application file for complete search history.

(56) References Cited

U.S. PATENT DOCUMENTS

| | | | |
|---|---|---|---|
| 10,171,292 B1 | 1/2019 | Dolan et al. | |
| 10,412,022 B1 | 9/2019 | Tang et al. | |
| 10,652,327 B2* | 5/2020 | Nidugala | H04L 41/0897 |
| 10,659,523 B1 | 5/2020 | Joseph et al. | |
| 10,671,443 B1 | 6/2020 | Ramachandran | |
| 10,884,807 B2 | 1/2021 | Shimamura et al. | |
| 10,938,677 B2 | 3/2021 | Shimamura et al. | |
| 11,082,333 B1 | 8/2021 | Lam et al. | |
| 11,429,453 B1* | 8/2022 | Hamman | G06F 9/505 |
| 2005/0288961 A1 | 12/2005 | Tabrizi | |
| 2013/0182712 A1 | 7/2013 | Aguayo et al. | |
| 2015/0135185 A1 | 5/2015 | Sirota et al. | |
| 2016/0299795 A1* | 10/2016 | Kagami | G06F 9/5027 |
| 2019/0196879 A1 | 6/2019 | Dutta et al. | |
| 2020/0285975 A1* | 9/2020 | Suparna | H04L 67/10 |
| 2020/0404059 A1 | 12/2020 | Feiguine et al. | |
| 2021/0234756 A1 | 7/2021 | Fong et al. | |
| 2023/0076488 A1 | 3/2023 | Goiri Presa et al. | |

OTHER PUBLICATIONS

U.S. Appl. No. 17/474,951, filed Sep. 14, 2021.

* cited by examiner

*Primary Examiner* — Gregory A Kessler
(74) *Attorney, Agent, or Firm* — Knobbe, Martens, Olson & Bear, LLP

(57) ABSTRACT

Disclosed are various embodiments for preemptive scheduling for a serverless High Performance Computing (HPC) architecture. In one embodiment, workloads are scheduled for execution by an infrastructure including a plurality of clusters. Execution of a particular workload is interrupted according to a scheduled interruption, and the particular workload is transferred from a first machine instance in a particular cluster to a second machine instance in the particular cluster. The execution of the particular workload is resumed by the second machine instance.

20 Claims, 10 Drawing Sheets

PREEMPTIVE SCHEDULING FOR SERVERLESS HIGH PERFORMANCE COMPUTING

BACKGROUND

High Performance Computing (HPC) generally refers to the practice of aggregating computing resources in a way that delivers improved performance over typical desktop computers or workstations. HPC has seen wide adoption over the years by users in several industries as a way to run large-scale scientific, engineering, and simulation workloads to accelerate research and development of products and services, as well as time-to-market.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 11B is a drawing of an example infrastructure according to various embodiments of the present disclosure.

DETAILED DESCRIPTION

Figure 1A:
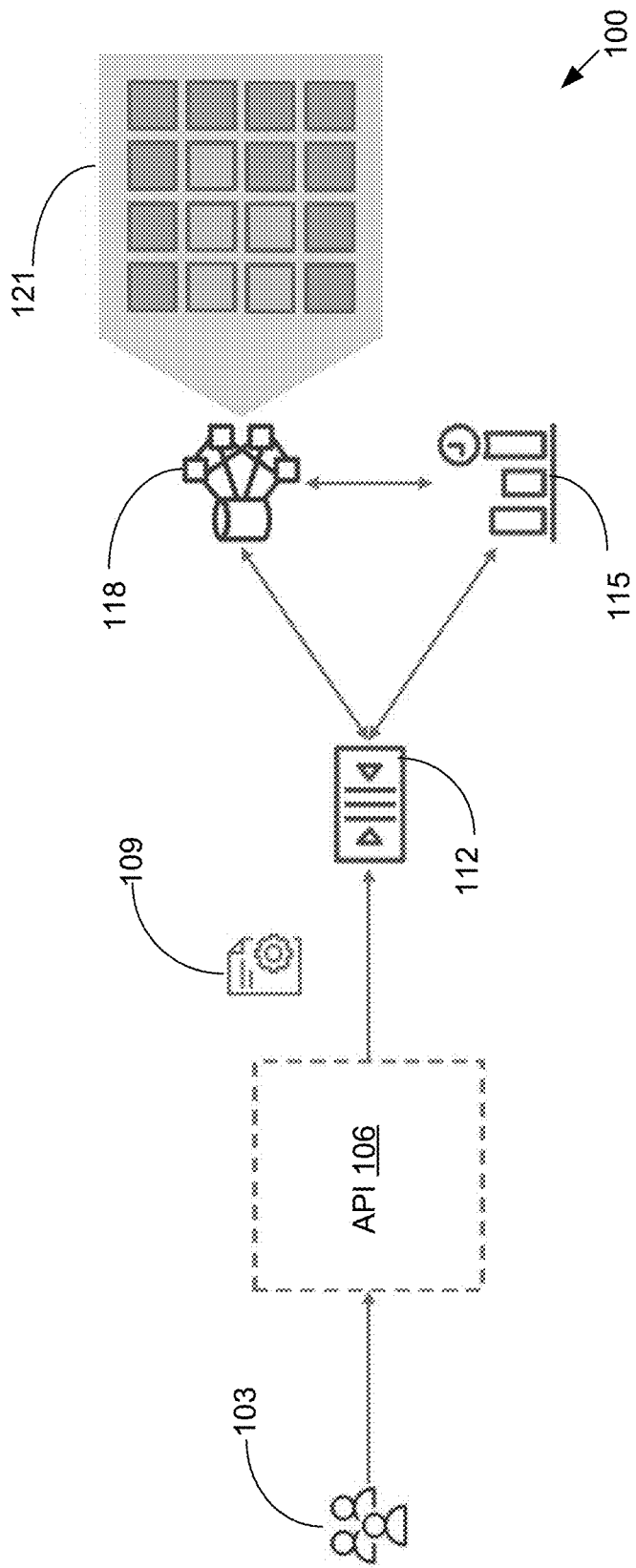
FIG. 1A is a drawing of a usage overview of an example infrastructure according to various embodiments of the present disclosure.

The present disclosure relates to a serverless High Performance Computing (HPC) architecture. Users have traditionally operated HPC clusters on-premises as collections of tightly coupled compute, storage, and networking resources. However, such infrastructure is expensive, has high operational costs and requires sophisticated workload management software to enable scientists, researchers, and developers to submit coordinated work for execution. The inelastic nature of on-premises environments coupled with sudden changes in demand or business needs causes users to experience long wait times and lost productivity. Moreover, procurement and installation cycles of additional capacity can be lengthy and risky, and invariably leads to undesirable large upfront investments.

Cloud computing has introduced the ability to scale beyond the capacity of traditional data centers with utility pricing based on consumption. Nonetheless, using cloud computing for steady-state consumption, which may be typical of HPC, is not necessarily economical. The process of provisioning clusters, reserved for Information Technology Professionals and System Administrators, is decoupled from a workload manager's main goal, which is to efficiently distribute work across all available capacity. But in a cloud computing environment, where capacity is elastic, being efficient can have an entirely different meaning. Furthermore, deploying highly optimized clusters, capable of scaling to tens of thousands of compute cores, is a complex manual process that requires deep knowledge of the cloud computing application programming interfaces (APIs), service limits, and mechanisms for scaling. Also, a cloud computing environment may offer low cost ephemeral machine instances that can be interrupted at any time, which is not at all analogous to on-premises computing capacity. Failure to rearchitect or containerize applications so that they can use such ephemeral machine instances may result in efficiency losses.

Containers have revolutionized computing for they allow both environment and execution of tasks to be defined and encapsulated in a repeatable manner. Cloud computing environments may offer broad and deep functionality for containerized workloads with various services. Despite abundant benefits, containers are not typically used in HPC because containers are often not a good fit for demanding, licensed, and legacy applications. For example, applications may not execute under containerized environments, or there may be licensing restrictions preventing such execution. Also, the use of containers may normally require applications to be rearchitected to some extent, and such a transformation may be risky and can take years depending on the size and complexity of the workload. Moreover, running containers in a cloud computing environment may require deep knowledge of service limits and mechanisms for scaling. Running large-scale containerized workloads remains a complex problem.

Various embodiments of the present disclosure introduce a serverless HPC architecture that brings together an infrastructure manager and a workload manager to facilitate execution of diverse HPC workloads in cloud computing environments. To reduce barriers to entry, the serverless HPC architecture includes a consistent and native HPC environment that is well suited for demanding, licensed, and legacy applications. To improve efficiency, the serverless HPC architecture leverages ephemeral machine instances when possible and provides mechanisms for handling interruptions.

As one skilled in the art will appreciate in light of this disclosure, certain embodiments may be capable of achieving certain advantages, including some or all of the following: (1) improving the efficiency of HPC workload processing by allowing for ephemeral computing resources subject to unpredictable interruption to be used for allocating HPC clusters; (2) improving flexibility in HPC architectures by facilitating the concurrent use of cloud resources and on-premises resources to process workloads; (3) facilitating either horizontal or vertical scaling of computing resources to adapt to constraints imposed by licensed applications or applications that use a message passing framework; (4) improving the efficiency of HPC workload processing by permitting HPC workloads to be preempted and transferred from one computing resource to another, thereby adapting to interruptions in ephemeral computing resources or allowing workloads having certain requirements to be executed on computing resources having capabilities meeting those requirements; and so forth. In the following discussion, a general description of the system and its components is provided, followed by a discussion of the operation of the same.

Referring to FIG. 1A, shown is an example of a usage overview 100 of an HPC infrastructure according to various embodiments. Users 103, who may be, for example, scientists, researchers, developers, or other users, interact with interfaces such as the application programming interface (API) 106 or a user interface to submit workloads 109. The workloads 109 may include a script or other configuration file that defines a task to be performed. The incoming workloads 109 are stored in a queue 112, and a workload manager 115 schedules the workloads 109 for execution on one or more clusters 118. In scheduling the workloads 109, the workload manager 115 generates a schedule 121 that assigns the workloads 109, or portions of workloads 109, to specific clusters 118 or computing resources within the clusters 118.

Figure 1B:
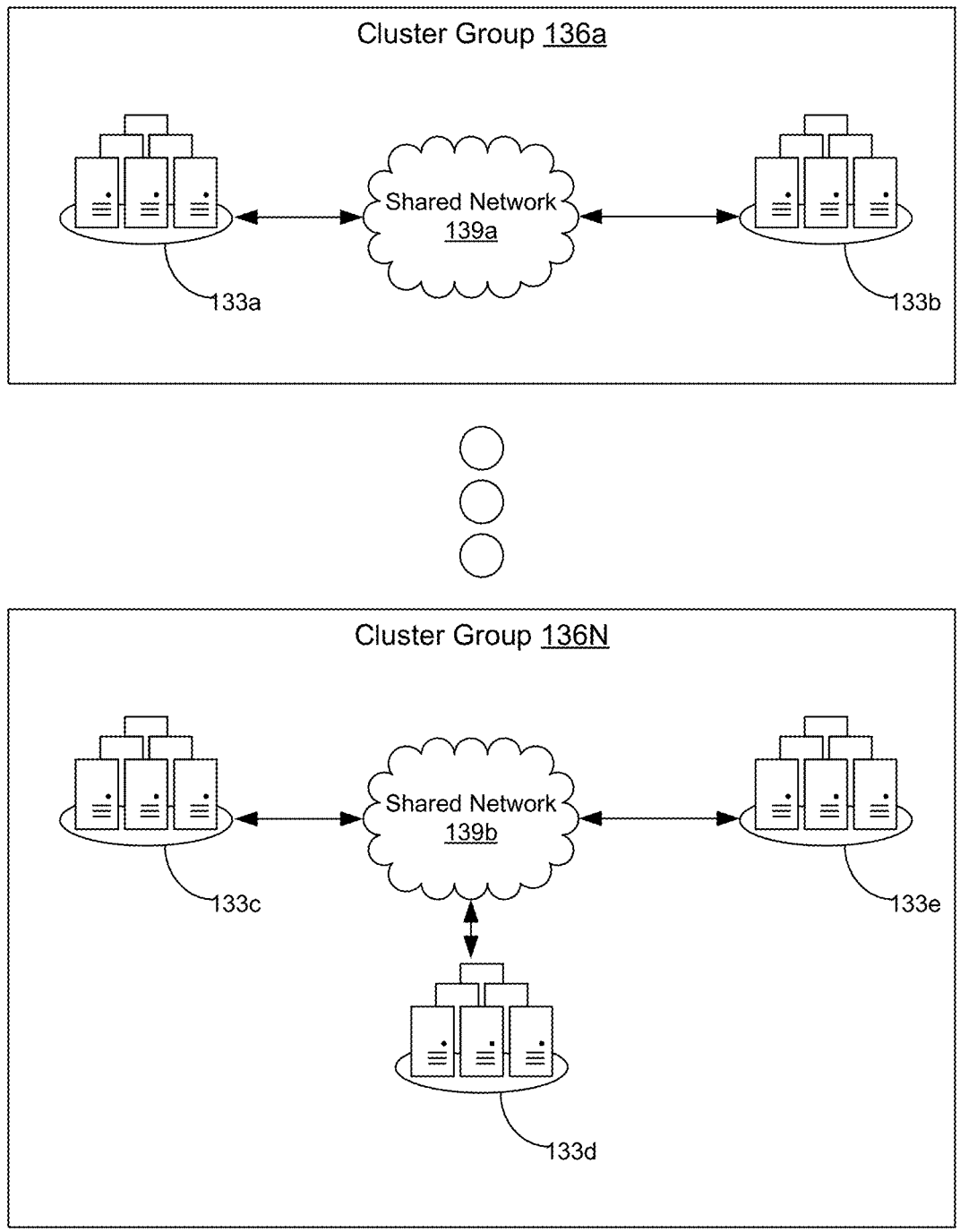

Turning now to FIG. 1B, shown is an example of an HPC infrastructure 130 according to various embodiments. The HPC infrastructure 130 includes a plurality of clusters 133 assigned individually to a plurality of cluster groups 136a . . . 136N. For example, clusters 133a and 133b are in cluster group 136a, while clusters 133c, 133d, and 133e are in cluster group 136N. Although each of the clusters 133 are generally in the HPC infrastructure 130 and can receive and process workloads, the clusters 133 within a cluster group 136 are in data communication with each other via a respective shared network 139. In this example, clusters 133a and 133b can communicate via the shared network 139a, and clusters 133c, 133d, and 133e can communicate via the shared network 139b. Thus, the workloads are assigned to clusters 133 such that the workloads assigned to a particular cluster group 136 may depend on communication with each other. As will be discussed, the HPC infrastructure 130 may include portions (e.g., cluster groups 136) within a cloud provider network and potentially also portions that are within a customer's on-premises network.

Figure 2:
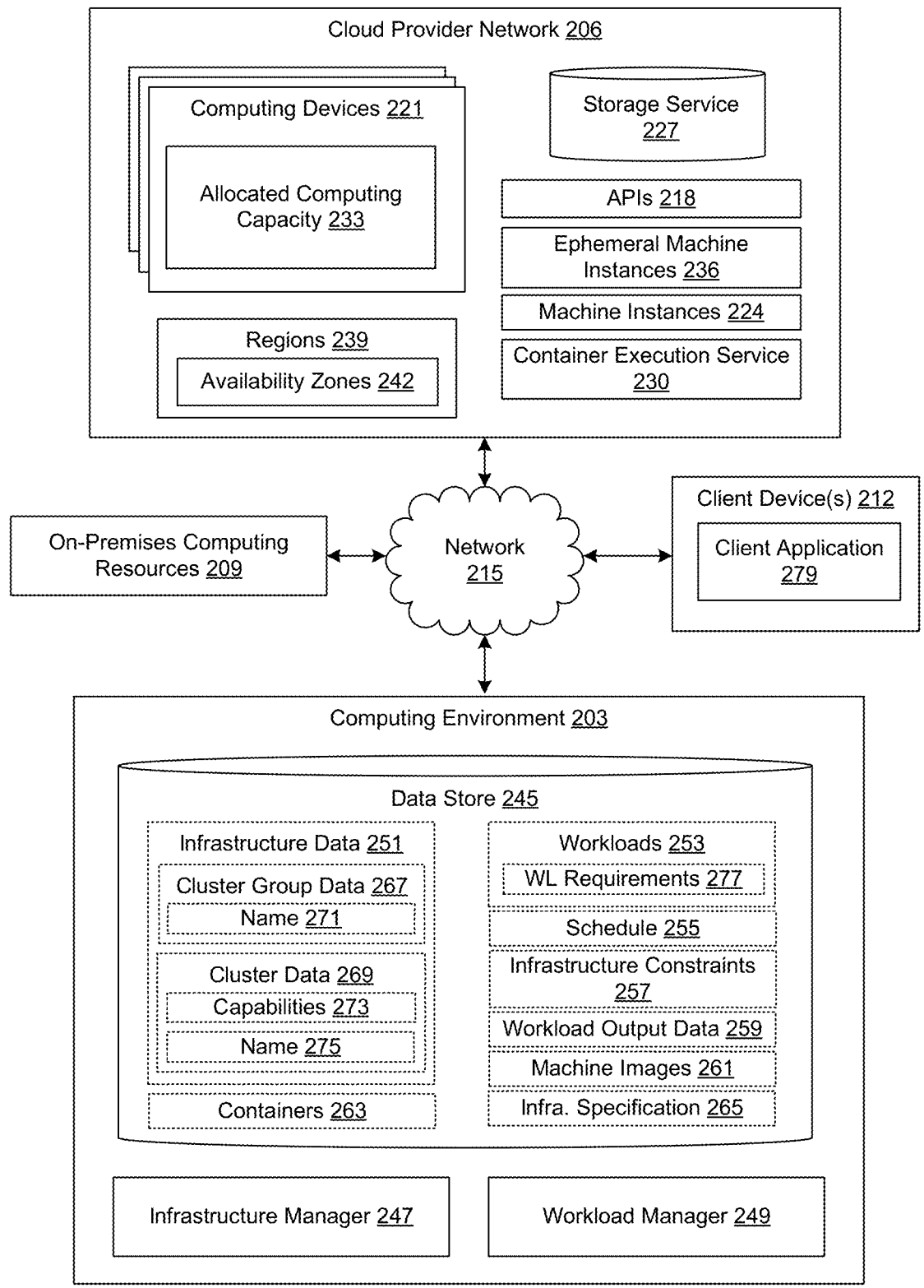
FIG. 2 is a schematic block diagram of a networked environment according to various embodiments of the present disclosure.

With reference to FIG. 2, shown is a networked environment 200 according to various embodiments. The networked environment 200 includes a computing environment 203, a cloud provider network 206, on-premises computing resources 209, and one or more client devices 212, which are in data communication with each other via a network 215. The network 215 includes, for example, the Internet, intranets, extranets, wide area networks (WANs), local area networks (LANs), wired networks, wireless networks, cable networks, satellite networks, or other suitable networks, etc., or any combination of two or more such networks.

A cloud provider network 206 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to a variable load. Cloud computing can thus be considered as both the applications delivered as services over a publicly accessible network (e.g., the Internet, a cellular communication network) and the hardware and software in cloud provider data centers that provide those services.

The cloud provider network 206 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 206 resources and services using one or more application programming interfaces (APIs) 218. An API 218 refers to an interface and/or communication protocol between a client device 212 and a server, such that if the client makes a request in a predefined format, the client should receive a response in a specific format or cause a defined action to be initiated. In the cloud provider network context, APIs 218 provide a gateway for customers to access cloud infrastructure by allowing customers to obtain data from or cause actions within the cloud provider network 206, enabling the development of applications that interact with resources and services hosted in the cloud provider network 206. APIs 218 can also enable different services of the cloud provider network 206 to exchange data with one another. Users can choose to deploy their virtual computing systems to provide network-based services for their own use and/or for use by their customers or clients.

The cloud provider network 206 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 206, for example it may not be possible to route from a substrate network address to an address in a production network that runs services of the cloud provider, or to a customer network that hosts customer resources.

The cloud provider network 206 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of an overlay internet protocol (IP) and a network identifier to a substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 206. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 206 for routing packets between endpoints.

The traffic and operations of the cloud provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane includes customer resources that are implemented on the cloud provider network 206 (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 206 include a flag to indicate whether the traffic is control plane traffic or data plane traffic. In some embodiments, the payload of traffic may be inspected to determine its type (e.g., whether control or data plane). Other techniques for distinguishing traffic types are possible.

The data plane can include one or more computing devices 221, which may be bare metal (e.g., single tenant) or may be virtualized by a hypervisor to run multiple VMs or machine instances 224 or microVMs for one or more customers. These compute servers can support a virtualized computing service (or "hardware virtualization service") of the cloud provider network 206. The virtualized computing service may be part of the control plane, allowing customers to issue commands via an API 218 to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers, which can include persistent storage for storing volumes of customer data, as well as software for managing these volumes. These block store servers can support a managed block storage service 227 of the cloud provider network 206. The managed block storage service 227 may be part of the control plane, allowing customers to issue commands via the API 218 to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host.

The data of the volume may be replicated between multiple devices within the cloud provider network 206, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used).

The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include storage services 227 for one or more object store servers, which represent another type of storage within the cloud provider network 206. The object storage servers include one or more servers on which data is stored as objects within resources referred to as buckets and can be used to support a managed object storage service of the cloud provider network 206. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

The cloud provider network 206 may also include a container execution service 230 that executes containers on behalf of customers using a container runtime. In some examples, the container may be stateless and may not have access to underlying operating system resources in a computing device 221.

The computing devices 221 may have various forms of allocated computing capacity 233, which may include virtual machine (VM) instances, containers, serverless functions, and so forth. The VM instances may be instantiated from a VM image. To this end, customers may specify that a virtual machine instance should be launched in a particular type of computing device 221 as opposed to other types of computing devices 221. In various examples, one VM instance may be executed singularly on a particular computing device 221, or a plurality of VM instances may be executed on a particular computing device 221. Also, a particular computing device 221 may execute different types of VM instances, which may offer different quantities of resources available via the computing device 221. For example, some types of VM instances may offer more memory and processing capability than other types of VM instances.

As allocated computing capacity 233, the machine instances 224 may be executed until scheduled maintenance or indefinitely. Further, there may be ephemeral machine instances 236 that may be allocated computing capacity 233, but the ephemeral machine instances 236 may be susceptible to unpredictable interruptions. For example, the ephemeral machine instances 236 may correspond to spare computing capacity in the computing devices 221, which may be offered at a discounted cost. In some cases, customers may place bids for use of the ephemeral machine instances 236. However, in view of increased demand, the ephemeral machine instances 236 may be interrupted or terminated at any time outside the control of the customer. In some scenarios, the cloud provider network 206 may provide the customer with a warning notification before the ephemeral machine instances 236 are terminated or interrupted (e.g., a warning two minutes before termination, a warning 60 minutes before termination, etc.).

In some cases, customers may reserve capacity for machine instances 224 or other computing capacity in the cloud provider network 206 that are not instantiated or launched yet. For example, the customer may incur an on-going cost for the reservation of the capacity, but the cost of instantiating or using the capacity may be less than if no reservation were made.

A cloud provider network 206 can be formed as a plurality of regions 239, where a region 239 is a separate geographical area in which the cloud provider has one or more data centers. Each region 239 can include two or more availability zones (AZs) 242 connected to one another via a private high-speed network such as, for example, a fiber communication connection. An availability zone 242 refers to an isolated failure domain including one or more data center facilities with separate power, separate networking, and separate cooling relative to other availability zones. A cloud provider may strive to position availability zones 242 within a region 239 far enough away from one another such that a natural disaster, widespread power outage, or other unexpected event does not take more than one availability zone offline at the same time. Customers can connect to resources within availability zones 242 of the cloud provider network 206 via a publicly accessible network (e.g., the Internet, a cellular communication network, a communication service provider network). Transit Centers (TC) are the primary backbone locations linking customers to the cloud provider network 206 and may be co-located at other network provider facilities (e.g., Internet service providers, telecommunications providers). Each region 239 can operate two or more TCs for redundancy. Regions 239 are connected to a global network which includes private networking infrastructure (e.g., fiber connections controlled by the cloud service provider) connecting each region 239 to at least one other region. The cloud provider network 206 may deliver content from points of presence (PoPs) outside of, but networked with, these regions 239 by way of edge locations and regional edge cache servers. This compartmentalization and geographic distribution of computing hardware enables the cloud provider network 206 to provide low-latency resource access to customers on a global scale with a high degree of fault tolerance and stability.

In various embodiments, computing capacity within a region 239 (or within an availability zone 242) may be able to communicate via a shared network 139 (FIG. 1B). For example, the region 239 or availability zone 242 may have a range of private network addresses that allow for data communication among the computing devices 221 or machine instances 224 without going over the Internet or an inter-region 239 link that may have higher associated costs. Through the use of a virtual private network, private links may be established between computing capacity in different regions 239.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time. For example, in some embodiments, the computing environment 203 may be hosted on a cloud provider network 206.

Various applications and/or other functionality may be executed in the computing environment 203 according to various embodiments. Also, various data is stored in a data store 245 that is accessible to the computing environment 203. The data store 245 may be representative of a plurality of data stores 245 as can be appreciated. The data stored in the data store 245, for example, is associated with the operation of the various applications and/or functional entities described below.

The components executed on the computing environment 203, for example, include an infrastructure manager 247, a workload manager 249, and other applications, services, processes, systems, engines, or functionality not discussed in detail herein. The infrastructure manager 247 may provision HPC clusters 133 (FIG. 1B) just-in-time, and may be capable of scaling to, for example, tens of thousands of compute cores to meet demand, while avoiding overprovisioning capacity. This may involve very fast infrastructure ramp-up and ramp-down times. In order to scale to tens of thousands of compute cores or more, the infrastructure manager 247 may have to provision clusters 133 across multiple availability zones 242, perhaps across virtual private networks and distinct regions 239. However, the infrastructure manager 247 may be configured to provision resources in a way that is cost-optimized.

To simplify cluster management at a high-level, users are given the ability to specify logical clusters 133 and cluster groups 136 (FIG. 1B), but do so without thinking about infrastructure. Instead, a user selects the target use-case (such as compute-intensive, storage-intensive, network-intensive applications, or mixed-case) and optionally, tags the cluster with additional functionality, e.g., graphics processing unit (GPU) acceleration, machine learning, Message Passing Interface (MPI), distributed computing, etc. The infrastructure manager 247 may use established best practices in the cloud provider network 206 to deploy highly optimized infrastructure tuned for needs of the workload.

The workload manager 249 is configured to generate execution schedules for workloads and to assign the workloads to clusters 133 and cluster groups 136. The workload manager 249 may also preempt the execution of workloads, either to move the workloads to different computing resources or to move different workloads to a computing resource. The workload manager 249 may implement a batch system for scheduling in which users do not run their workloads directly and interactively as they do on their own personal computers. Instead, under a batch system, the users submit non-interactive tasks to the workload manager 249. The workload manager 249 serves as the interface for users and may have the following goals: minimizing the time between task submission and the time it takes to finish so that no task should remain queued for extensive periods of time; optimizing resource utilization so that available compute capacity, networking and storage should be used efficiently to reduce waste; minimizing task throughput to manage as many tasks per unit time as possible; and so on.

The workload manager 249 may use elements from a combination of scheduling techniques with the addition of preemption to schedule workloads. For example, in first-come, first-serve scheduling, tasks run in the same order as they are queued. The advantage is that every task will run, however, very tiny tasks may wait an inadequately long time to be placed compared to their actual execution time. In shortest-first scheduling, based on the execution time declared for each task, the workload manager 249 can estimate how long it will take to execute the task. Then, jobs are ranked by that time from shortest to longest. While short tasks will start after a short waiting time, long-running tasks may never actually start. In backfill scheduling, the workload manager 249 maintains the concept of first-come, first-serve scheduling without preventing short tasks from executing. Essentially, tasks are reordered in such a way that allows for maximal resource utilization.

The data stored in the data store 245 includes, for example, infrastructure data 251, one or more workloads 253, a schedule 255, one or more infrastructure constraints 257, workload output data 259, one or more machine images 261, one or more containers 263, an infrastructure specification 265, and potentially other data. The infrastructure data 251 contains a state representation of an HPC infrastructure 130 (FIG. 1B) deployed by the infrastructure manager 247. The workload manager 249 can access the infrastructure data 251 in determining where to deploy specific workloads 253.

The infrastructure data 251 may include cluster group data 267, cluster data 269, and other data. The cluster group data 267 includes data describing the state of a cluster group 136, which may include a plurality of clusters 133 and a shared network 139. The cluster group data 267 may include a unique name 271 identifying a cluster group 136. The cluster data 269 may include a set of capabilities 273 and a unique name 275 identifying a cluster 133. The cluster data 269 may associate a specific cluster type with the cluster 133, such as a burst cluster type, a static cluster type, a native cluster type, or another type.

A burst cluster type will be managed by the infrastructure manager 247 to provide a virtually unlimited capacity, so that cluster 133 will be scaled as needed to meet demand. The static cluster type may be associated with capacity limits, which may be required to handle restrictions associated with licensed applications. For example, licensed applications may be licensed per-instance, which would weigh towards having more resource-capable instances via vertical scaling instead of horizontally scaling with additional instances. Static cluster types may be preferably scaled vertically instead of horizontally. A native cluster type may be a steady-state HPC cluster 133 that is ready to receive work at any time. This may be discouraged in deployments in a cloud provider network 206 but may be used for computability in on-premises computing resources 209.

The set of capabilities 273 defined for each cluster 133 may include a target use case, for example, a computing-intensive use case, a storage-intensive use case, a network-intensive use case, and so on. The set of capabilities 273 may include a respective functionality tag for each cluster 133 such as a graphics processing unit (GPU) acceleration tag, a machine learning tag, a message passing interface (MPI) tag, a distributed computing tag, or another tag, which can be used to select types of computing resources, such as machine instances 224, for execution.

The workloads 253 correspond to computing tasks that are sent to the workload manager 249 for execution in an HPC infrastructure 130. Such workloads 253 may include simulations and calculations for scientific or industrial projects. For example, the workloads 253 may include an extract, transform, and load pipeline for processing data from multiple data sources into a single, consistent data warehouse. The workloads 253 may be associated with various workload requirements 277, which may include target times for completion, cost budgets, whether GPUs or other specific hardware are required, a level of compute capacity required, a level of storage capacity required, a level of network capacity required, whether the workload 253 is stateful or stateless, whether the workload 253 requires a licensed application to be processed, whether the workload 253 depends on other workloads 253, and so forth. The workload requirements 277 may also indicate whether a workload 253 is capable of being preempted via a managed checkpoint and restore, or if the workload 253 is not capable of being preempted.

The workloads 253 may be specified by configuration files, a command-line interface, or a graphical user interface (e.g., a sequence of web pages or mobile application screens), or another interface. The workloads 253 may specify integrations with one or more cloud services, such as to save the workload output data 259 to the storage service 227 using specific buckets and formats.

The schedule 255 is generated by the workload manager 249 to map workloads 253 to clusters 133. In various embodiments, scheduled workloads 253 may be interrupted, and the workload manager 249 may need to regenerate the schedule 255 and/or request that the infrastructure manager 247 modify the HPC infrastructure 130 in order to accommodate preempted workloads 253.

The infrastructure constraints 257 may include maximum cost budgets, constraints due to maximum numbers of instances of licensed applications, time limits, and other constraints that may impact scaling clusters 133 either vertically or horizontally. The workload output data 259 corresponds to the data that is the output of the completed workloads 253. This data may be further processed by other workloads 253 or may be returned to the customer as a result.

The machine images 261 correspond to machine instance configurations that are used to launch the machine instances 224 that are capable of processing the assigned workloads 253. The machine images 261 may have an operating system and applications that are configured to process the workloads 253. In some cases, the applications may be licensed applications that are subject to licensing requirements that restrict total numbers of instances. The containers 263 are similar to the machine images 261 but may not include a full operating system and are configured for execution by a container runtime, for example, through the container execution service 230.

The infrastructure specification 265 corresponds to a user specification of an infrastructure to be deployed by the infrastructure manager 247. The infrastructure specification 265 may be specified by way of a configuration file, a command-line interface, a graphical user interface (e.g., a sequence of web pages or mobile application screens), or another interface.

The client device 212 is representative of a plurality of client devices that may be coupled to the network 215. The client device 212 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 212 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 212 may be configured to execute various applications such as a client application 279 and/or other applications. The client application 279 may be executed in a client device 212, for example, to access network content served up by the computing environment 203 and/or other servers, thereby rendering a user interface on the display. To this end, the client application 279 may comprise, for example, a browser, a dedicated application, etc., and the user interface may comprise a network page, an application screen, etc. The client device 212 may be configured to execute applications beyond the client application 279 such as, for example, email applications, social networking applications, word processors, spreadsheets, and/or other applications.

The client application 279 may be used to create specifications such as specifications of workloads 253 and infrastructure specifications 265 and to submit these specifications to the infrastructure manager 247 or to the workload manager 249. The client application 279 may also present reports of budgets, including allocated budgets, spent budgets, and unallocated budgets; cluster health, including whether clusters 133 are online, offline, or in an error state; workload health, including quantities of workloads 253 that are running, queued, or idle. The client application 279 may facilitate interactive control and modification of clusters 133 and cluster groups 136, while also providing access to monitoring and logging functionality.

Figure 3A:
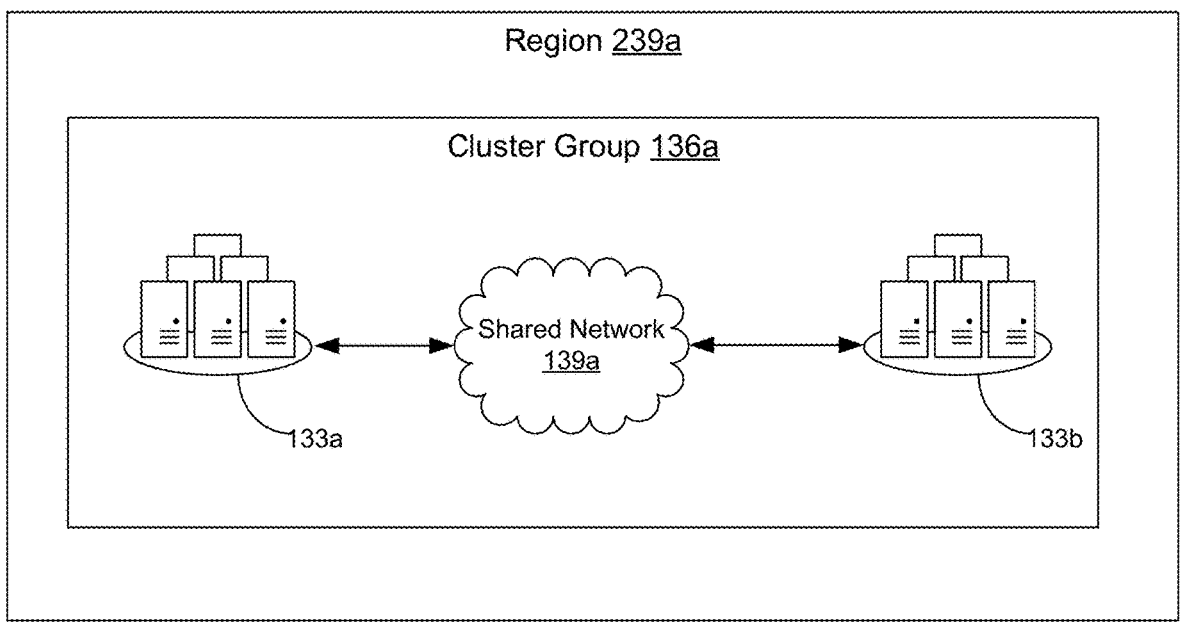
FIG. 3A is a drawing of an example of a cluster group implemented in a single region according to various embodiments of the present disclosure.

Referring next to FIG. 3A, shown is an example of a cluster group 136a that is implemented entirely within a single region 239a. This may be a preferable arrangement in that the region 239a may natively offer a shared network 139a so that the clusters 133a and 133b can communicate with each other, while minimizing costs of the communication. However, sufficient resources may not exist to allocate all clusters 133 within a cluster group 136a within a single region 239a, or those resources may be cost prohibitive. For example, each cluster 133 may correspond to an individual step within an extract-transform-load (ETL) pipeline, and the clusters 133 may need to communicate with one another.

Figure 3B:
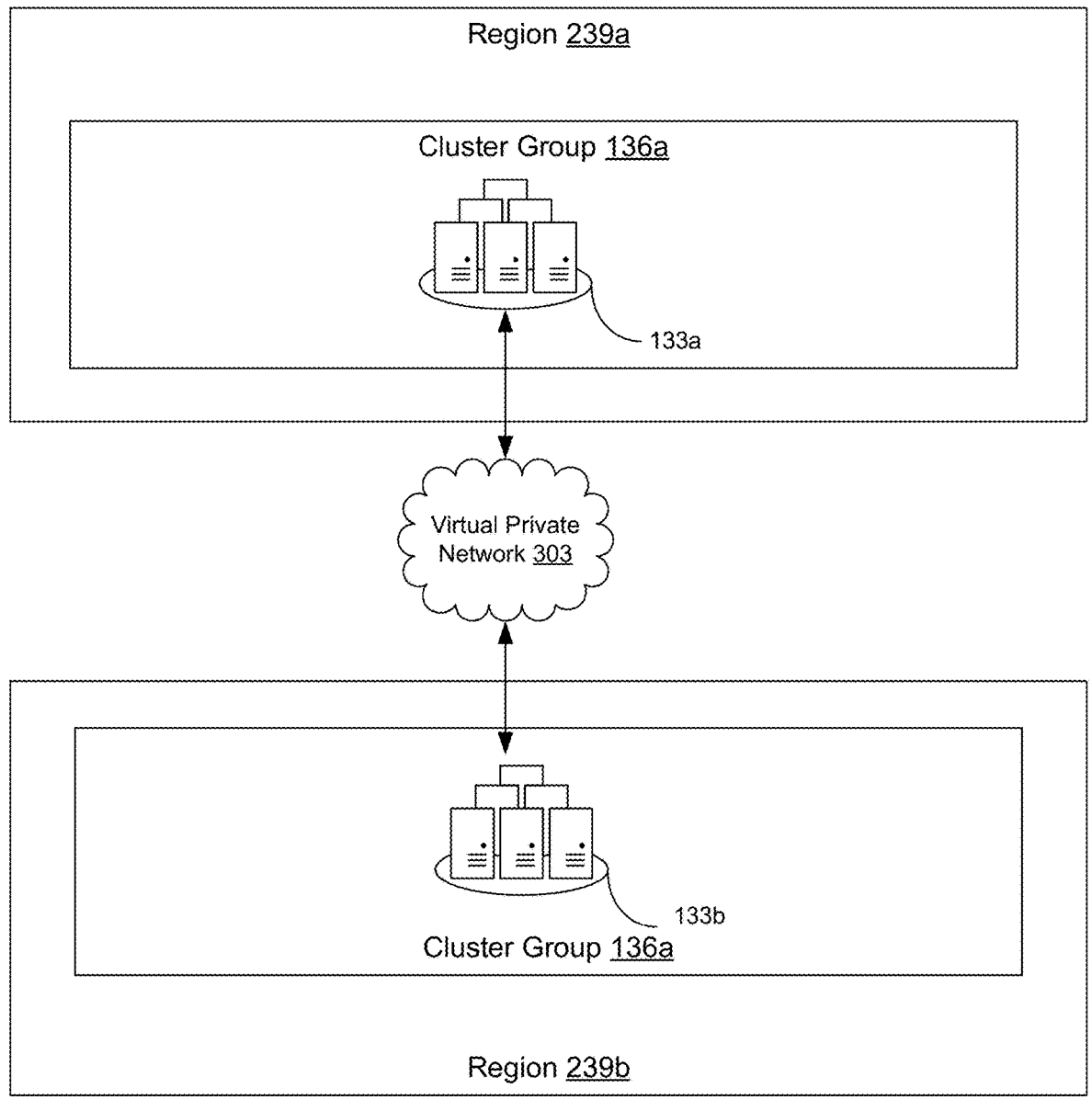
FIG. 3B is a drawing of an example of a cluster group implemented in a plurality of regions according to various embodiments of the present disclosure.

By comparison, in FIG. 3B, the cluster group 136a is split across a plurality of regions 239a and 239b. The shared network 139a (FIG. 3A) between the clusters 133a and 133b is facilitated by way of a virtual private network 303, which allows the clusters 133a and 133b to communicate as if they were on a common local network, using for example a private subnetwork of network addresses. In one example, the shared network 139a is created by joining or peering two separate virtual private networks 303 to form a single shared network 139a. The inter-region communication by way of the virtual private network 303 may be more costly and potentially slower than communication within a region 239, but such an arrangement may be used to scale the cluster group 136 to meet requirements or to stay within a budget constraint. For example, a pool of computing hardware with a specific type of processor may be available only within one country, and this hardware may be required by the cluster 133a, while another type of computing hardware is much more cost effectively sourced in another country for use in the cluster 133b.

FIGS. 3C-3F depict various scheduling approaches that may be used by the workload manager 249 (FIG. 2) according to various embodiments. In FIGS. 3C-3F, Tasks A through G are assigned to execute on six different nodes, Node 0 through Node 5.

Figure 3C:
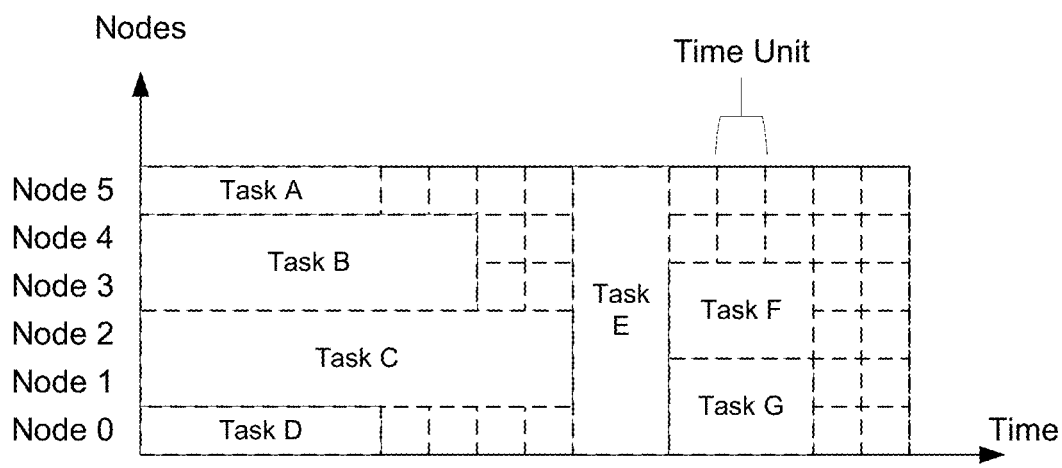
FIGS. 3C-3F are drawings depicting examples of different scheduling approaches according to various embodiments of the present disclosure.

FIG. 3C provides an example of first-come, first-serve scheduling. Tasks A through D are assigned to execute first, then later arriving tasks are assigned to execute. As a result, Nodes 0, 3, 4, and 5 are unutilized while Task C is executing and after Tasks A, B, and D have completed.

Figure 3D:
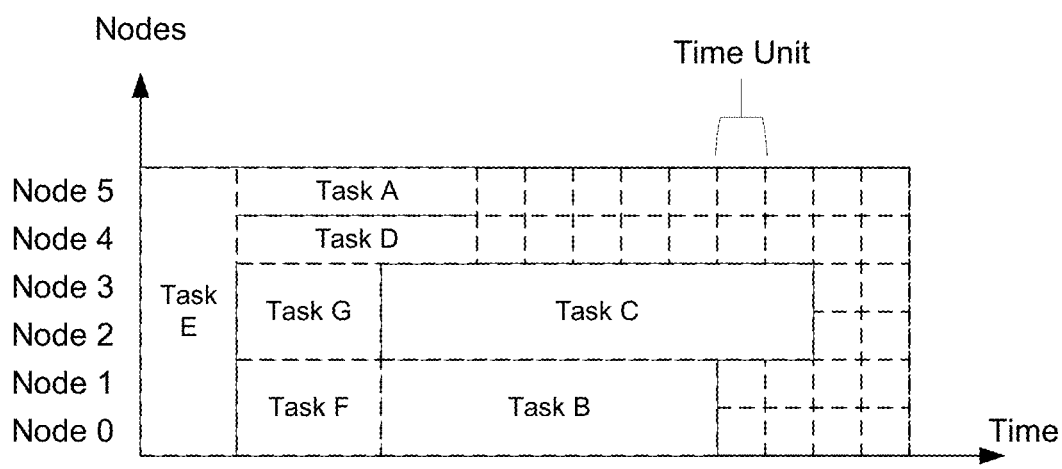

FIG. 3D provides an example of shortest-first scheduling, which rearranges Task E to execute first, as it completes in just two time units. As compared with FIG. 3C, more tasks are completed earlier in FIG. 3D, but the overall time to finish all tasks remains the same.

Figures 3E, 3F:
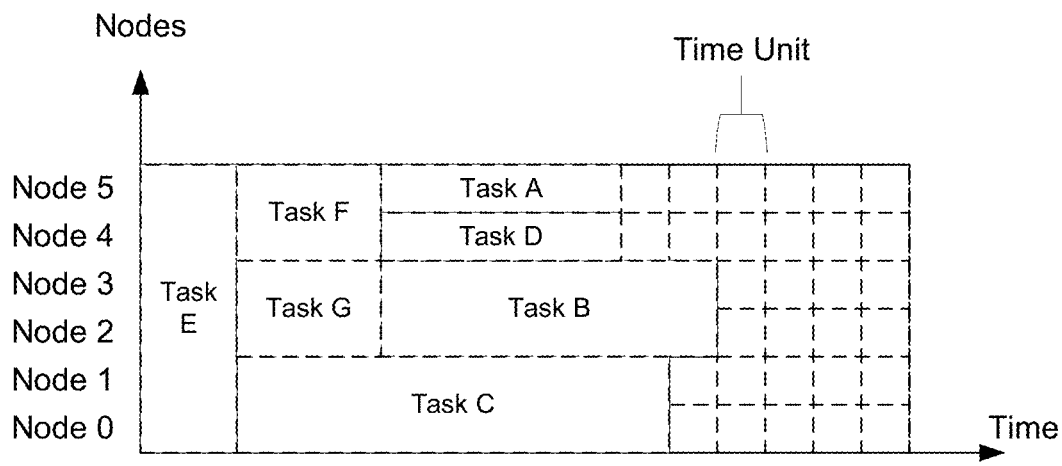

FIG. 3E provides an example of backfill scheduling or simple reordering. The workload manager 249 reorders the tasks optimally in order to most effectively use the node capacity. As a result, the time to finish all tasks is reduced by two time units, but Nodes 0, 1, 4, and 5 are utilized while Task C completes execution on Nodes 2 and 3.

FIG. 3F provides an example of preemptive scheduling. In FIG. 3F, Task C is preempted on Nodes 4 and 5 after executing for one time unit, and Task C is later transferred to Nodes 2 and 3 in order to complete. As a result, the time to finish all tasks is further reduced compared to FIG. 3E by one time unit, and no nodes are unutilized at any time. Thus, no infrastructure needs to be over-provisioned, and the infrastructure remains cost optimized. Scheduling the preemption improves performance assuming that the time units are relatively large (e.g., 30 minutes, an hour, etc.). If the time units were relatively small (e.g., one second, 30 seconds, etc.), the time involved in interrupting a node and saving its state may overwhelm the performance gain associated with preemptive scheduling.

Figure 4:
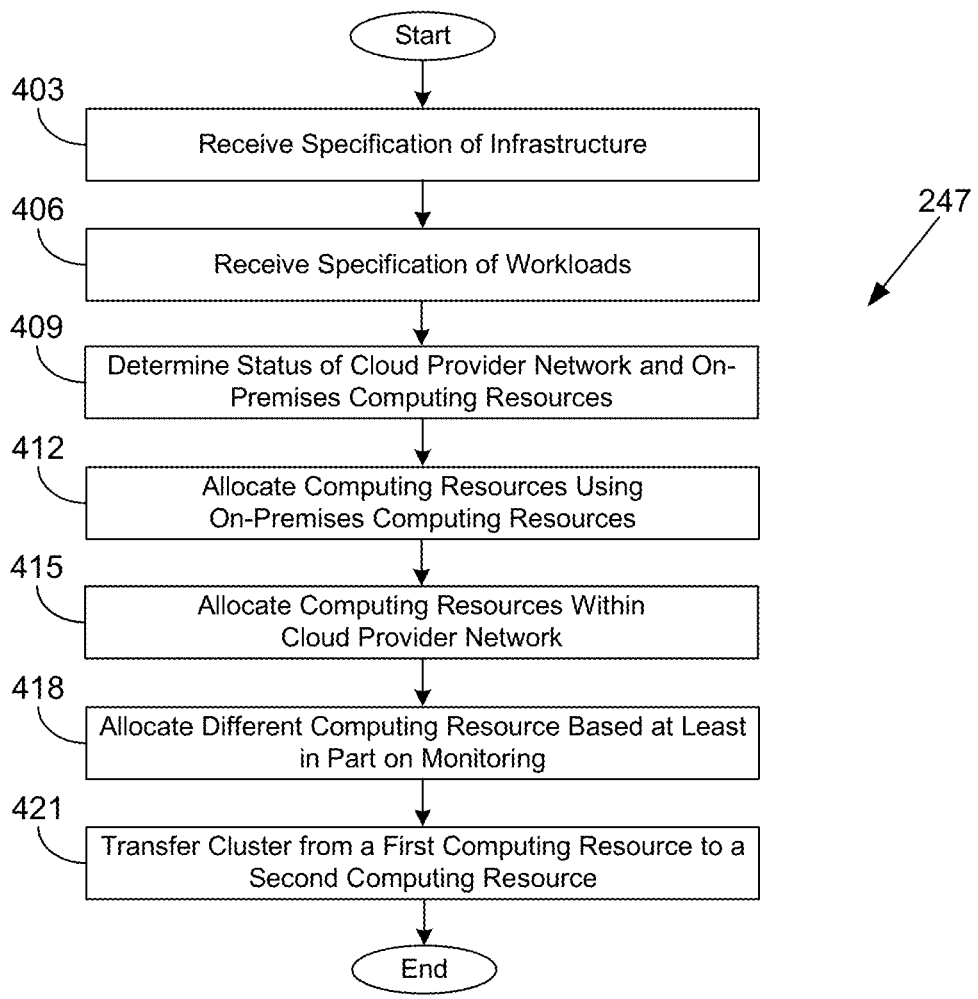
FIG. 4 is a flowchart illustrating one example of functionality implemented as portions of an infrastructure manager executed in a computing environment in the networked environment of FIG. 2 according to various embodiments of the present disclosure.

Referring next to FIG. 4, shown is a flowchart that provides one example of the operation of a portion of the infrastructure manager 247 according to various embodiments. It is understood that the flowchart of FIG. 4 provides merely an example of the many different types of functional arrangements that may be employed to implement the operation of the portion of the infrastructure manager 247 as described herein. As an alternative, the flowchart of FIG. 4 may be viewed as depicting an example of elements of a method implemented in the computing environment 203 (FIG. 2) according to one or more embodiments.

Beginning with box 403, the infrastructure manager 247 receives an infrastructure specification 265 (FIG. 2) from a user to allocate a serverless HPC infrastructure 130 (FIG. 1B) in a cloud provider network 206 (FIG. 2). The infrastructure specification 265 may specify one or more clusters 133 (FIG. 1B) that are assigned to one or more cluster groups 136 (FIG. 1B). The infrastructure specification 265 may further specify sets of capabilities 273 (FIG. 2) to be assigned to particular clusters 133, along with a name 275 (FIG. 2) for the clusters 133 and a name 271 (FIG. 2) for the cluster groups 136. The cluster type may also be specified (e.g., burst, static, native, etc.). In some cases, the infrastructure specification 265 may specify on-premises computing resources 209 (FIG. 2) or other computing resources to be allocated to the HPC infrastructure 130 outside of a cloud provider network 206. For example, the on-premises computing resources 209 may be native legacy servers that have licensed applications installed, which may be preferred for some types of workloads 253 (FIG. 2) or to reduce costs associated with the use of the cloud provider network 206. The infrastructure specification 265 may also specify infrastructure constraints 257 (FIG. 2) such as time and cost budget and licensing constraints that may require vertical instead of horizontal scaling.

In box 406, the infrastructure manager 247 receives a specification of workloads 253 to be executed in the HPC infrastructure 130. The specification may include various workload requirements 277 (FIG. 2) that may be considered in instantiating types of HPC infrastructure 130. In box 409, the infrastructure manager 247 determines a status of the cloud provider network 206 and the on-premises computing resources 209. For example, the infrastructure manager 247 may determine what resources are available in the on-premises computing resources 209 and costs associated with allocating resources in the cloud provider network 206 in different regions 239 (FIG. 2) and availability zones 242 (FIG. 2) and for different types of computing resources.

In box 412, the infrastructure manager 247 allocates computing resources using the on-premises computing resources 209 until the on-premises computing resources 209 are exhausted. That is to say, the infrastructure manager 247 may allocate a computing resource outside of the cloud provider network 206 in order to implement one or more clusters 133. In some cases, the on-premises computing resources 209 may not be on-premises of a customer but may instead be owned by or leased to the customer in colocation or data center space. In other words, the infrastructure manager 247 may create one or more clusters 133 and/or cluster groups 136 using the on-premises computing resources 209.

In box 415, the infrastructure manager 247 allocates computing resources within the cloud provider network 206 using the APIs 218 (FIG. 2) based at least in part on the specified respective capabilities 273 of the clusters 133. For example, the infrastructure manager 247 may allocate machine instances 224 (FIG. 2), including ephemeral machine instances 236 (FIG. 2), and may allocate capacity for containers 263 (FIG. 2) to be executed by the container execution service 230. The allocation of machine instances 224 may include launching the machine instances 224 from specific machine images 261 (FIG. 2) associated with the cluster 133. In some cases, the infrastructure manager 247 may allocate reserved machine instances 224 that are not susceptible to unpredictable interruption, and the infrastructure manager 247 may reserve capacity for bare-metal machine instances 224 alongside or instead of virtual machine instances 224. The infrastructure manager 247 allocates the computing resources in accordance to the specification, the capabilities 273, and the infrastructure constraints 257 such as a quantity of the computing resources, a type of the computing resources, a lifetime of the computing resources, a cost budget, and/or other factors, in order to achieve an optimal allocation of resources. Also, the infrastructure manager 247 may determine whether to allocate cluster groups 136 within the same region 239 (as in FIG. 3A) or in different regions 239 (as in FIG. 3B), while balancing resource availability, capabilities 273 required of the clusters 133, and infrastructure constraints 257 such as time and budget.

In box 418, the infrastructure manager 247 may allocate a different computing resource in the cloud provider network 206 in response to monitoring the HPC infrastructure 130 via the APIs 218. For example, the infrastructure manager 247 may detect termination or interruption of ephemeral machine instances 236 and may allocate a different computing resource as a replacement. Also, the infrastructure manager 247 may determine that a characteristic of the allocated computing resources no longer meets a workload requirement 277, a cluster capability, or an infrastructure constraint 257. For example, the infrastructure manager 247 may detect that a cost of a machine instance 224 has increased beyond a budgeted constraint and may replace that machine instance 224 with a lower cost machine instance 224. Alternatively, the infrastructure manager 247 may detect that the cost of a more capable machine instance 224 has decreased and may replace an existing machine instance 224 with the more capable machine instance 224. In other scenarios, the infrastructure manager 247 may modify the infrastructure by simply adding new computing resources or removing existing computing resources. Computing resources may be transferred or scaled between regions 239 and availability zones 242 based upon updated cost, availability, and/or other factors.

In box 421, the infrastructure manager 247 may transfer a cluster 133 from a first computing resource to a second computing resource. That is to say, in modifying the infrastructure in box 418, the outcome may be to transfer a cluster 133 from one region 239 to another or from one type of machine instance 224 to another type of machine instance 224, and the infrastructure manager 247 carries that modification into effect. Thereafter, the operation of the portion of the infrastructure manager 247 ends.

Figure 5:
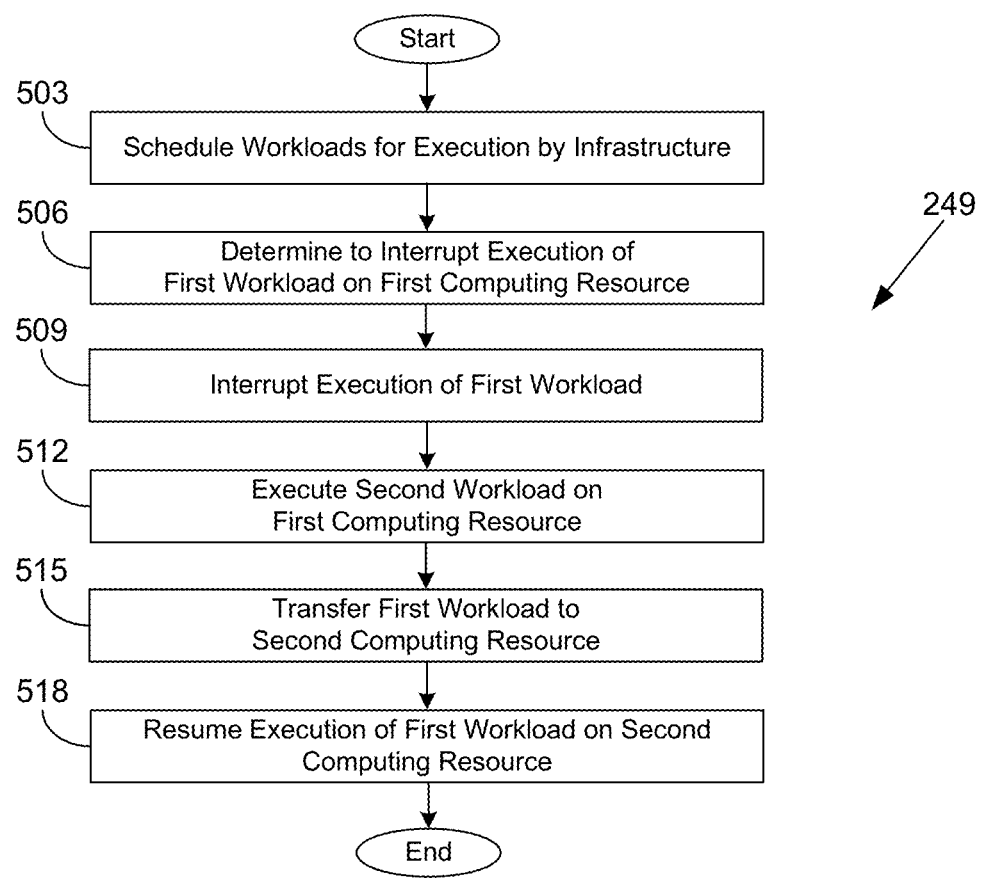
FIG. 5 is a flowchart illustrating one example of functionality implemented as portions of a workload manager executed in a computing environment in the networked environment of FIG. 2 according to various embodiments of the present disclosure.

Turning now to FIG. 5, shown is a flowchart that provides one example of the operation of a portion of the workload manager 249 according to various embodiments. It is understood that the flowchart of FIG. 5 provides merely an example of the many different types of functional arrangements that may be employed to implement the operation of the portion of the workload manager 249 as described herein. As an alternative, the flowchart of FIG. 5 may be viewed as depicting an example of elements of a method implemented in the computing environment 203 (FIG. 2) according to one or more embodiments.

Beginning with box 503, the workload manager 249 schedules workloads 253 (FIG. 2) for execution in an HPC infrastructure 130 (FIG. 1B), which may include a serverless HPC infrastructure 130 in a cloud provider network 206 (FIG. 2) and/or a native HPC infrastructure 130 as part of on-premises computing resources 209 (FIG. 2). The scheduling may be undertaken to optimally match workloads 253 given their workload requirements 277 (FIG. 2) to clusters 133 (FIG. 1B) given their capabilities 273 (FIG. 2) and also whether communication with other clusters 133 is required (i.e., whether the workload 253 should be assigned to a same cluster group 136 (FIG. 1B) as another workload 253).

The workload manager 249 may also schedule planned preemptions or interruptions in order to most efficiently use the allocated computing capacity 233 (FIG. 2) via bin-packing as in FIG. 3F. For example, the workload manager 249 may schedule an interruption of a first workload 253. Such a scheduled interruption may allow the workload 253 to be migrated to different compute nodes, even potentially in a different region 239 (FIG. 2). The workload manager 249 may schedule the planned preemptions so that the minimum running time for a workload 253 is much larger than the time involved in interrupting the node, saving the state, and transferring in a new workload 253.

In box 506, the workload manager 249 determines to interrupt execution of a first workload 253 on a first computing resource such as a machine instance 224 (FIG. 2) or a container execution service 230 (FIG. 2). For example, the workload manager 249 may determine that a second workload 253 requiring some capability 273 of the first computing resource would be a more efficient use of the first computing resource because the first workload 253 may be able to be executed elsewhere. In another example, the workload manager 249 may determine that a lower cost computing resource has become available to execute the first workload 253. In yet another example, the workload manager 249 may determine that the first workload 253 is subject to an unpredictable interruption by virtue of running on an ephemeral machine instance 236 (FIG. 2). The workload manager 249 may select the first workload 253 for interruption because the first workload 253 may support interruption while other workloads 253 may not. In some cases, the interruption of the first workload 253 may be a scheduled or planned interruption in order to most efficiently use the allocated computing capacity 233. Otherwise, the interruption may be determined dynamically based on real-time observations (e.g., capacity monitoring, ephemeral machine instance 236 usage, etc.) to further optimize scheduling. In one embodiment, the workload manager 249 may assign workloads 253 to ephemeral machine instances 236 only when the workloads 253 are capable of being suspended or saved within the time period after an interruption warning notification. For example, in the case of a two-minute interruption warning, the workload manager 249 may assign a workload 253 to an ephemeral machine instance 236 if it is capable of being saved within the two-minute time period. Otherwise, the workload manager 249 may assign the workload 253 to machine instances 224 that will not be unpredictably interrupted.

In some cases, the workload manager 249 may determine not to preempt a particular workload 253. For example, the workload 253 may be time sensitive and configured to execute during a specific time period of the day or on a specific date. Preempting the workload 253 may move its execution outside of a permittable time period, which would not be allowed, even if the workload 253 could technically be interrupted by suspending the machine instance 224 in which it is executed.

In another example, the workload manager 249 may determine to use a vertical scaling for executing the first workload 253 instead of a horizontal scaling based at least in part on a licensing requirement associated with executing the first workload 253, where the vertical scaling involves replacing a first machine instance 224 with a second machine instance 224 having increased resources, and the horizontal scaling involves adding the second machine instance 224 so that both the first machine instance 224 and the second machine instance 224 execute the first workload 253. The workload manager 249 may also determine to use vertical scaling for applications that use a message passing interface (MPI), as communication between applications that use MPI may be much faster within a machine instance 224 rather than across multiple machine instances 224. Alternatively, the workload manager 249 may determine to use horizontal scaling for MPI application with constraints that the machine instances 224 be near one another (e.g., in the same rack in a data center, in the same data center, etc.) to allow for very high speed, low latency networking.

In box 509, the workload manager 249 interrupts execution of the first workload 253 on the first computing resource. Where the first computing resource is an ephemeral machine instance 236, the execution of the first workload 253 may be interrupted without action of the workload manager 249. In interrupting the execution, the first workload 253 may be configured to complete a managed checkpoint and potentially save state to the storage service 227 (FIG. 2). The first workload 253 may natively support preemption, or the workload manager 249 may force an interruption of the first workload 253 by suspending the container 263 (FIG. 2) or machine instance 224 that is executing the first workload 253.

In box 512, the workload manager 249 may execute a second workload 253 in place of the first workload 253 on the first computing resource, making sure that the first computing resource has capabilities that meet the requirements of the second workload 253. In box 515, the workload manager 249 may transfer the first workload 253 to a second computing resource for execution, making sure that the second computing resource has capabilities that meet the requirements of the first workload 253. In box 518, the workload manager 249 may resume execution of the first workload 253 on the second computing resource. The second computing resource may have a greater computational capability, a greater networking capability, or a greater storage capability as compared to the first computing resource. The workload manager 249 may also transfer a portion of the first workload 253 to be executed on a third computing resource. In other examples, the workload manager 249 may wait until the second workload 253 completes on the first computing resource before resuming execution of the first workload 253 on the first computing resource. Thereafter, the operation of the portion of the workload manager 249 ends.

Figure 6:
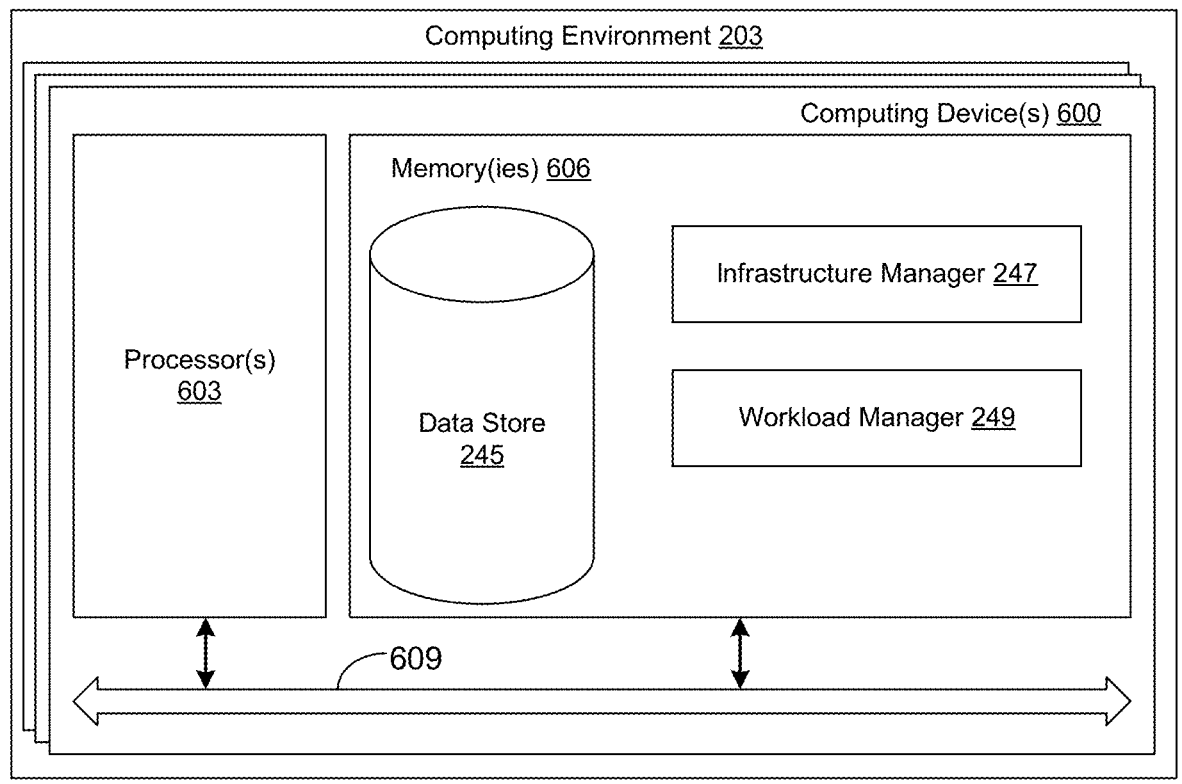
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the infrastructure manager 247, the workload manager 249, and potentially other applications. Also stored in the memory 606 may be a data store 245 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic©, Python©, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the infrastructure manager 247, the workload manager 249, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the infrastructure manager 247 and the workload manager 249. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the infrastructure manager 247 and the workload manager 249, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the infrastructure manager 247 and the workload manager 249, may be implemented and structured in a variety of ways. For example, one or more applications described may be implemented as modules or components of a single application. Further, one or more applications described herein may be executed in shared or separate computing devices 600 or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure may be described by one or more of the following clauses:

Clause 1. A system comprising: a cloud provider network providing elastic computing capacity under a utility computing model; and at least one computing device configured to at least: receive a specification of a serverless high performance computing (HPC) infrastructure to execute a plurality of workloads, the specification defining a plurality of cluster groups and a plurality of clusters and assigning one or more clusters of the plurality of clusters to individual cluster groups of the plurality of cluster groups, individual clusters of the plurality of clusters corresponding to one or more computing resources having a respective set of capabilities defined in the specification for execution of a subset of the plurality of workloads, each individual cluster group supporting a respective shared network among the one or more clusters assigned to the individual cluster group; and allocate computing resources within the cloud provider network to implement the plurality of clusters and the plurality of cluster groups according to the specification, the computing resources being allocated to have the respective set of capabilities for the individual clusters and the respective shared network for the individual cluster groups, the computing resources including one or more ephemeral machine instances that are susceptible to an unpredictable interruption.

Clause 2. The system of clause 1, wherein the at least one computing device is further configured to at least allocate another computing resource outside of the cloud provider network to implement one or more of the plurality of clusters.

Clause 3. The system of clauses 1 to 2, wherein the specification defines one or more allocation constraints that limit at least one of: a quantity of the computing resources, a type of the computing resources, and a lifetime of the computing resources, and the computing resources are allocated based at least in part on the allocation constraints.

Clause 4. The system of clauses 1 to 3, wherein the cloud provider network includes a plurality of regions, and the at least one computing device is further configured to at least determine whether to implement the respective shared network by allocating the computing resources for the one or more clusters in a respective cluster group within a single region of the plurality of regions or by allocating the computing resources for the one or more clusters in at least two regions of the plurality of regions and also creating a virtual private network to provide the respective shared network for the one or more clusters across the at least two regions.

Clause 5. The system of clauses 1 to 4, wherein the at least one computing device is further configured to at least allocate the one or more ephemeral machine instances based at least in part on the respective sets of capabilities.

Clause 6. The system of clauses 1 to 5, wherein the computing resources further include one or more reserved machine instances that are not susceptible to the unpredictable interruption, and the at least one computing device is further configured to at least allocate the one or more reserved machine instances based at least in part on the respective sets of capabilities.

Clause 7. The system of clauses 1 to 6, wherein the specification associates a corresponding cluster type with the individual clusters, and the corresponding cluster type comprises at least one of: a burst cluster type, a static cluster type, or a native cluster type.

Clause 8. The system of clauses 1 to 7, wherein the specification associates a corresponding unique cluster name with the individual clusters.

Clause 9. The system of clauses 1 to 8, wherein the respective sets of capabilities include a respective target use case for the individual clusters, the respective target use case comprising at least one of: a computing-intensive use case, a storage-intensive use case, or a network-intensive use case.

Clause 10. The system of clauses 1 to 9, wherein the respective sets of capabilities include a respective functionality tag for the individual clusters, the respective functionality tag comprising at least one of: a graphics processing unit (GPU) acceleration tag, a machine learning tag, a message passing interface (MPI) tag, or a distributed computing tag.

Clause 11. A computer-implemented method, comprising: receiving a specification of an infrastructure to execute a plurality of workloads, the specification defining at least one cluster group and a plurality of clusters and assigning one or more clusters of the plurality of clusters to individual cluster groups of the at least one cluster group, individual clusters of the plurality of clusters corresponding to one or more computing resources having a respective set of capabilities defined in the specification for execution of a subset of the plurality of workloads, each individual cluster group supporting a respective shared network among the one or more clusters assigned to the individual cluster group; and allocating computing resources within a cloud provider network to implement the plurality of clusters and the at least one cluster group according to the specification, the computing resources being allocated to have the respective set of capabilities for the individual clusters and the respective shared network for the at least one cluster group.

Clause 12. The computer-implemented method of clause 11, further comprising: monitoring execution of the plurality of workloads on the computing resources; and allocating a different computing resource within the cloud provider network to implement the plurality of clusters and the at least one cluster group based at least in part on the monitoring.

Clause 13. The computer-implemented method of clauses 11 to 12, further comprising: determining that a characteristic of at least one of the computing resources no longer meets a constraint defined in the specification; and allocating at least one different computing resource within the cloud provider network to implement one or more of the plurality of clusters and the at least one cluster group in response to determining that the characteristic no longer meets the constraint.

Clause 14. The computer-implemented method of clauses 11 to 13, wherein allocating the computing resources within the cloud provider network further comprises allocating an ephemeral machine instance to implement one or more of the plurality of clusters, the ephemeral machine instance being susceptible to an unpredictable interruption.

Clause 15. The computer-implemented method of clauses 11 to 14, wherein the cloud provider network includes a plurality of regions, and the method further comprises: implementing a particular cluster group of the at least one cluster group in a first region of the plurality of regions and in a second region of the plurality of regions; and implementing a virtual private network to facilitate data communication in the particular cluster group between at least one first cluster in the first region and at least one second cluster in the second region.

Clause 16. A non-transitory computer-readable medium embodying a program executable in at least one computing device, wherein when executed the program causes the at least one computing device to at least: receive a specification of an infrastructure to execute a plurality of workloads, the specification defining at least one cluster group and a plurality of clusters and assigning one or more clusters of the plurality of clusters to individual cluster groups of the at least one cluster group, individual clusters of the plurality of clusters corresponding to one or more computing resources having a respective set of capabilities defined in the specification for execution of a subset of the plurality of workloads, each individual cluster group supporting a respective shared network among the one or more clusters assigned to the individual cluster group; allocate computing resources within a cloud provider network to implement the plurality of clusters and the at least one cluster group according to the specification, the computing resources being allocated to have the respective set of capabilities for the individual clusters and the respective shared network for the at least one cluster group; and transfer a particular cluster from a first computing resource to a second computing resource in response to determining that the first computing resource no longer meets a constraint for the particular cluster defined in the specification.

Clause 17. The non-transitory computer-readable medium of clause 16, wherein the at least one cluster group comprises a first cluster group and a second cluster group, and the first cluster group and the second cluster group are on different networks.

Clause 18. The non-transitory computer-readable medium of clauses 16 to 17, wherein when executed the program further causes the at least one computing device to at least allocate another cluster group implementing one or more of the plurality of clusters on one or more computing devices on premises of a customer.

Clause 19. The non-transitory computer-readable medium of clauses 16 to 18, wherein the respective sets of capabilities include a respective target use case for the individual clusters, the respective target use case comprising at least one of: a computing-intensive use case, a storage-intensive use case, or a network-intensive use case; and wherein the respective sets of capabilities further include a respective functionality tag for the individual clusters, the respective functionality tag comprising at least one of: a graphics processing unit (GPU) acceleration tag, a message passing interface (MPI) tag, or a distributed computing tag.

Clause 20. The non-transitory computer-readable medium of clauses 16 to 19, wherein the specification associates a corresponding cluster type with the individual clusters, and the corresponding cluster type comprises at least one of: a burst cluster type, a static cluster type, or a native cluster type.

Clause 21. A system, comprising: a cloud provider network providing elastic computing capacity under a utility computing model; a serverless high performance computing (HPC) infrastructure implemented in the cloud provider network and including a plurality of clusters and at least one cluster group to which the plurality of clusters are individually assigned; and at least one computing device configured to at least: schedule a plurality of workloads for execution by the serverless HPC infrastructure, wherein execution of a particular workload includes a scheduled interruption; interrupt the execution of the particular workload of the plurality of workloads according to the scheduled interruption; transfer the particular workload from a first machine instance in a particular cluster of the plurality of clusters to a second machine instance in the particular cluster; and resume the execution of the particular workload by the second machine instance.

Clause 22. The system of clause 21, wherein the at least one computing device is further configured to at least determine to interrupt the execution of the particular workload in order to execute another workload of the plurality of workloads on the first machine instance based at least in part on a capability of the first machine instance required by the other workload.

Clause 23. The system of clause 22, wherein the second machine instance does not have the capability, and the particular workload does not require the capability.

Clause 24. The system of clauses 21 to 23, wherein the at least one computing device is further configured to at least allocate the second machine instance after the execution of the particular workload on the first machine instance is interrupted.

Clause 25. The system of clauses 21 to 24, wherein the at least one computing device is further configured to at least determine to use a vertical scaling for executing the particular workload instead of a horizontal scaling based at least in part on a licensing requirement associated with executing the particular workload, the vertical scaling involving replacing the first machine instance with the second machine instance having increased resources, the horizontal scaling involving adding the second machine instance so that both the first machine instance and the second machine instance execute the particular workload.

Clause 26. The system of clauses 21 to 25, wherein the particular workload is associated with a set of capabilities, and the first machine instance and the second machine instance are selected for executing the particular workload based at least in part on the set of capabilities.

Clause 27. The system of clauses 21 to 26, wherein the first machine instance corresponds to an ephemeral machine instance susceptible to an unpredictable interruption.

Clause 28. The system of clauses 21 to 27, wherein the at least one computing device is further configured to at least determine that the second machine instance has become available after interrupting the execution of the particular workload.

Clause 29. The system of clauses 21 to 28, wherein the at least one computing device is further configured to at least execute a different workload of the plurality of workloads on the first machine instance instead of the particular workload after interrupting the execution of the particular workload.

Clause 30. A computer-implemented method, comprising: scheduling a plurality of workloads for execution by an infrastructure including a plurality of clusters, wherein execution of a particular workload includes a scheduled interruption; interrupting the execution of a particular workload of the plurality of workloads according to the scheduled interruption; transferring the particular workload from a first machine instance in a particular cluster of the plurality of clusters to a second machine instance in the particular cluster; and resuming the execution of the particular workload by the second machine instance.

Clause 31. The computer-implemented method of clause 30, wherein the second machine instance provides at least one of: a greater computational capability, a greater networking capability, or a greater storage capability as compared to the first machine instance.

Clause 32. The computer-implemented method of clauses 30 to 31, further comprising transferring a portion of the particular workload from the second machine instance to a third machine instance in the particular cluster.

Clause 33. The computer-implemented method of clauses 30 to 32, wherein the particular workload is containerized.

Clause 34. The computer-implemented method of clauses 30 to 33, wherein the particular workload is executed by a licensed application executing on the second machine instance.

Clause 35. The computer-implemented method of clauses 30 to 34, wherein scheduling the plurality of workloads for execution further comprises selecting the particular cluster to execute the particular workload based at least in part on determining that a set of capabilities of the particular cluster meets a set of requirements of the particular workload.

Clause 36. A non-transitory computer-readable medium embodying a program executable in at least one computing device, wherein when executed the program causes the at least one computing device to at least: schedule a plurality of workloads for execution by an infrastructure including a plurality of clusters; interrupt execution of a first workload of the plurality of workloads on a machine instance in a particular cluster of the plurality of clusters; and execute a second workload of the plurality of workloads on the machine instance instead of the first workload.

Clause 37. The non-transitory computer-readable medium of clause 36, wherein when executed the program further causes the at least one computing device to at least determine that the machine instance has a capability required by the second workload that is not required by the first workload.

Clause 38. The non-transitory computer-readable medium of clauses 36 to 37, wherein when executed the program further causes the at least one computing device to at least determine that an execution of the second workload on an ephemeral machine instance has been interrupted by an unpredictable interruption before interrupting the execution of the first workload and transferring the second workload from the ephemeral machine instance to the machine instance.

Clause 39. The non-transitory computer-readable medium of clauses 36 to 38, wherein the particular cluster is in a cloud provider network, and another cluster of the plurality of clusters is on an on-premises network of a customer.

Clause 40. The non-transitory computer-readable medium of clauses 36 to 39, wherein when executed the program further causes the at least one computing device to at least schedule the plurality of workloads for execution based at least in part on determining that a corresponding set of capabilities of respective ones of the plurality of clusters meets a corresponding set of requirements of respective ones of the plurality of workloads.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a cloud provider network providing elastic computing capacity under a utility computing model;
   a serverless high performance computing (HPC) infrastructure implemented in the cloud provider network and including a plurality of clusters and at least one cluster group to which the plurality of clusters are individually assigned; and
   at least one computing device configured to at least:
      schedule a plurality of workloads for execution by the serverless HPC infrastructure;
      schedule a scheduled interruption of a particular workload of the plurality of workloads, based on one or more workload criteria, wherein the one or more workload criteria comprise a dependency between the particular workload and at one additional workload in the plurality of workloads;
      interrupt the execution of the particular workload of the plurality of workloads according to the scheduled interruption;
      transfer the particular workload from a first machine instance in a particular cluster of the plurality of clusters to a second machine instance in the particular cluster; and
      resume the execution of the particular workload by the second machine instance.

2. The system of claim 1, wherein the one or more workload criteria further comprise a capability of the first machine instance required by another workload, wherein the at least one computing device is further configured to at least determine to interrupt the execution of the particular workload in order to execute the other workload of the plurality of workloads on the first machine instance based at least in part on the capability of the first machine instance required by the other workload.

3. The system of claim 2, wherein the second machine instance does not have the capability, and the particular workload does not require the capability.

4. The system of claim 1 wherein the at least one computing device is further configured to at least allocate the second machine instance after the execution of the particular workload on the first machine instance is interrupted.

5. The system of claim 1 wherein the at least one computing device is further configured to at least determine to use a vertical scaling for executing the particular workload instead of a horizontal scaling based at least in part on a licensing requirement associated with executing the particular workload, the vertical scaling involving replacing the first machine instance with the second machine instance having increased resources, the horizontal scaling involving adding the second machine instance so that both the first machine instance and the second machine instance execute the particular workload.

6. The system of claim 1, wherein the one or more workload criteria further comprise a set of capabilities associated with the particular workload, and the first machine instance and the second machine instance are selected for executing the particular workload based at least in part on the set of capabilities.

7. The system of claim 1, wherein the first machine instance corresponds to an ephemeral machine instance susceptible to an unpredictable interruption.

8. The system of claim 1, wherein the at least one computing device is further configured to at least determine that the second machine instance has become available after interrupting the execution of the particular workload.

9. The system of claim 1, wherein the at least one computing device is further configured to at least execute a different workload of the plurality of workloads on the first machine instance instead of the particular workload after interrupting the execution of the particular workload.

10. A computer-implemented method, comprising:
    scheduling a plurality of workloads for execution by an infrastructure including a plurality of clusters;
    scheduling a scheduled interruption of a particular workload of the plurality of workloads, based on one or more workload criteria, wherein the one or more workload criteria comprise a dependency between the particular workload and at least one additional workload in the plurality of workloads;
    interrupting the execution of a particular workload of the plurality of workloads according to the scheduled interruption;
    transferring the particular workload from a first machine instance in a particular cluster of the plurality of clusters to a second machine instance in the particular cluster, and
    resuming the execution of the particular workload by the second machine instance.

11. The computer-implemented method of claim 10, wherein the second machine instance provides at least one of: a greater computational capability, a greater networking capability, or a greater storage capability as compared to the first machine instance.

12. The computer-implemented method of claim 10, further comprising transferring a portion of the particular workload from the second machine instance to a third machine instance in the particular cluster.

13. The computer-implemented method of claim 10, wherein the particular workload is containerized.

14. The computer-implemented method of claim 10, wherein the particular workload is executed by a licensed application executing on the second machine instance.

15. The computer-implemented method of claim 10, wherein the one or more workload criteria further comprise a set of requirements of the particular workload, wherein scheduling the plurality of workloads for execution further comprises selecting the particular cluster to execute the particular workload based at least in part on determining that a set of capabilities of the particular cluster meets the set of requirements of the particular workload.

16. A non-transitory computer-readable medium embodying a program executable in at least one computing device, wherein when executed the program causes the at least one computing device to at least:
- schedule a plurality of workloads for execution by an infrastructure including a plurality of clusters;
- schedule a scheduled interruption of a particular workload of the plurality of workloads, based on one or more workload criteria, wherein the one or more workload criteria comprise a dependency between the particular workload and at least one additional workload in the plurality of workloads;
- interrupt the execution of a particular workload of the plurality of workloads according to the scheduled interruption;
- transfer the particular workload from a first machine instance in a particular cluster of the plurality of clusters to a second machine instance in the particular cluster; and
- resume the execution of the particular workload by the second machine instance.

17. The non-transitory computer-readable medium of claim 16, wherein when executed the program further causes the at least one computing device to at least transfer a portion of the particular workload from the second machine instance to a third machine instance in the particular cluster.

18. The non-transitory computer-readable medium of claim 16, wherein the second machine instance provides at least one of: a greater computational capability, a greater networking capability, or a greater storage capability as compared to the first machine instance.

19. The non-transitory computer-readable medium of claim 16, wherein the particular workload is executed by a licensed application executing on the second machine instance.

20. The non-transitory computer-readable medium of claim 16, wherein the one or more workload criteria further comprise a set of capabilities of the particular cluster meets a set of requirements of the particular workload, wherein scheduling the plurality of workloads for execution further comprises selecting the particular cluster to execute the particular workload based at least in part on determining that the set of capabilities of the particular cluster meets a set of requirements of the particular workload.

* * * * *